US009799905B2

(12) United States Patent
Shimazu et al.

(10) Patent No.: US 9,799,905 B2
(45) Date of Patent: *Oct. 24, 2017

(54) SOLID OXIDE FUEL CELL

(75) Inventors: Megumi Shimazu, Chigasaki (JP); Akira Ueno, Chigasaki (JP); Toshiya Abe, Chigasaki (JP); Motoyasu Miyao, Chigasaki (JP); Kenichi Hiwatashi, Chigasaki (JP)

(73) Assignee: TOTO LTD., Kitakyushu-Shi, Fukuoka (JP)

(*) Notice: Subject to any disclaimer, the term of this patent is extended or adjusted under 35 U.S.C. 154(b) by 505 days.

This patent is subject to a terminal disclaimer.

(21) Appl. No.: 13/983,007

(22) PCT Filed: Jan. 31, 2012

(86) PCT No.: PCT/JP2012/052184
§ 371 (c)(1),
(2), (4) Date: Jul. 31, 2013

(87) PCT Pub. No.: WO2012/105580
PCT Pub. Date: Aug. 9, 2012

(65) Prior Publication Data
US 2013/0309582 A1    Nov. 21, 2013

(30) Foreign Application Priority Data
Jan. 31, 2011    (JP) .................................. 2011-018763

(51) Int. Cl.
*H01M 8/1016*    (2016.01)
*H01M 4/90*    (2006.01)
(Continued)

(52) U.S. Cl.
CPC ........... *H01M 8/1016* (2013.01); *B32B 18/00* (2013.01); *C04B 35/486* (2013.01);
(Continued)

(58) Field of Classification Search
CPC ...... H01M 6/24; H01M 6/18; H01M 8/04477; H01M 8/0482; H01M 8/10; H01M 8/1002; H01M 8/1016
See application file for complete search history.

(56) References Cited

U.S. PATENT DOCUMENTS 6,558,831 B1 * 5/2003 Doshi ................. H01M 8/1206
429/495
7,820,332 B2 * 10/2010 Badding ............. H01M 8/1253
429/400
2005/0271919 A1 * 12/2005 Hata et al. ...................... 429/30

FOREIGN PATENT DOCUMENTS

JP    08-119732 A    5/1996
JP    11-214018 A    8/1999
(Continued)

OTHER PUBLICATIONS

Translation JP2004087490.*
(Continued)

*Primary Examiner* — Sarah A Slifka
*Assistant Examiner* — Brian Ohara
(74) *Attorney, Agent, or Firm* — Brinks Gilson & Lione; G. Peter Nichols

(57) ABSTRACT

Provided is a solid oxide fuel cell having a service life of approximately 90,000 hours, a level required to encourage the widespread use of SOFC. The solid oxide fuel cell is provided with a solid electrolyte layer, an oxygen electrode layer provided on one side of the solid electrolyte layer, and a fuel electrode layer provided on the other side of the solid electrolyte layer. The oxygen electrode layer is made from a material containing iron or manganese, and the solid electrolyte layer contains an yttria-stabilized zirconia solid electrolyte material having a lanthanoid oxide dissolved therein.

6 Claims, 4 Drawing Sheets

(51) Int. Cl.
*H01M 8/1253* (2016.01)
*H01B 1/12* (2006.01)
*B32B 18/00* (2006.01)
*C04B 35/486* (2006.01)
*C04B 35/626* (2006.01)

(52) U.S. Cl.
CPC ....... *C04B 35/62685* (2013.01); *H01B 1/122* (2013.01); *H01M 4/90* (2013.01); *H01M 8/1253* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3262* (2013.01); *C04B 2235/3267* (2013.01); *C04B 2235/3272* (2013.01); *C04B 2235/5445* (2013.01); *C04B 2235/75* (2013.01); *C04B 2235/762* (2013.01); *C04B 2235/765* (2013.01); *C04B 2235/9669* (2013.01); *C04B 2237/34* (2013.01); *C04B 2237/348* (2013.01); *H01M 2300/0077* (2013.01); *H01M 2300/0094* (2013.01); *Y02E 60/525* (2013.01); *Y02P 70/56* (2015.11)

(56) References Cited

FOREIGN PATENT DOCUMENTS

| | | | |
|---|---|---|---|
| JP | 2001-072465 A | | 3/2001 |
| JP | 2001-118590 A | | 4/2001 |
| JP | 2002-015754 A | | 1/2002 |
| JP | 2002-015757 A | | 1/2002 |
| JP | 2004-087490 A | | 3/2004 |
| JP | 2004087490 A | * | 3/2004 |
| JP | 2010-27359 A | | 2/2010 |

OTHER PUBLICATIONS

International Search Report in corresponding International Application No. PCT/JP2012/052184, dated Mar. 6, 2012, 2 pages.
Extended European Search Report in corresponding European Application No. 12741828.3, dated Jul. 15, 2015, 6 pages.

* cited by examiner

SOLID OXIDE FUEL CELL

This application is a 371 application of PCT/JP2012/052184 having an international filing date of Jan. 31, 2012, which claims priority to JP2011-018763 filed Jan. 31, 2011, the entire contents of which are incorporated herein by reference.

TECHNICAL FIELD

The present invention relates to a solid oxide fuel cell.

BACKGROUND ART

Conventionally, solid electrolyte materials such as yttria doped zirconia (hereinafter, referred to as YSZ) have been used in the applications of solid oxide fuel cells (hereinafter, abbreviated as SOFCs) and the like. SOFCs have higher electric power generation efficiencies and higher discharged thermal energy temperatures than other fuel cells, such as phosphoric acid-type fuel cells and molten carbonate-type fuel cells. Hence, SOFCs have attracted attention as a next-generation type energy-saving electric power generation system.

A basic structure of an SOFC includes a solid electrolyte layer, a fuel electrode layer, and an oxygen electrode layer. When a fuel gas such as hydrogen ($H_2$) flows through and thereby comes into contact with the fuel electrode layer, which faces one surface of the solid electrolyte layer, and an oxidizing agent gas such as the air or oxygen ($O_2$) flows through and thereby comes into contact with the oxygen electrode layer, which faces an opposite surface of the solid electrolyte layer, oxygen ions ($O^{2-}$) generated in the oxygen electrode layer move through the solid electrolyte layer to the fuel electrode layer, and the $O^{2-}$ react with $H_2$ in the fuel electrode layer. An electric output can be obtained by this electrochemical reaction.

A solid electrolyte material for an SOFC based on such a reaction mechanism needs to have the following characteristics: (1) high oxygen ion conductivity; (2) excellent long-term durability; (3) high material strength; and the like. Particularly from the viewpoint of long-term durability, the most preferred material is YSZ, among zirconia-based solid electrolyte materials.

As the oxygen electrode layer of an SOFC, strontium doped lanthanum manganite (hereinafter, referred to as LSM), strontium doped lanthanum ferrite (hereinafter, referred to as LSF), and strontium and iron doped lanthanum cobaltite (hereinafter, referred to as LSCF) are generally used. A cell is exposed to a high temperature during production of the oxygen electrode layer by the sintering method using any of these materials and during the operation of the cell. Hence, manganese (Mn) in the case of LSM or iron (Fe) in the cases of LSF and LSCF diffuses to YSZ, which is the solid electrolyte layer, and lowers the oxygen ion conductivity. To suppress the diffusion, a solid electrolyte layer of YSZ containing alumina has been proposed (see Japanese Patent Application Publication No. Hei 11-354139). Note that Japanese Patent Application Publication No. Hei 11-354139 does not describe the diffusion suppression effect. However, since a separately invented solid electrolyte layer made of scandia doped zirconia containing alumina is described to have the diffusion suppression effect, also the solid electrolyte layer of YSZ containing alumina presumably achieves the same effect (see Japanese Patent Application Publication No. Hei 8-250135).

SUMMARY OF THE INVENTION

The inclusion of alumina in YSZ makes it possible to suppress the doping and diffusion of Mn or Fe from the oxygen electrode to the inside of the YSZ. However, the Mn doping and the Fe doping cannot be completely zero, and the YSZ is doped with Mn or Fe and Mn or Fe is diffused near the interface of the YSZ with the fuel electrode layer, although the amount is trace.

A long-term durability test conducted for several hundred to several thousand hours on an SOFC using LSM as the oxygen electrode layer and having YSZ as the solid electrolyte layer showed that powder formation in a portion of the solid electrolyte layer occurred near the fuel electrode. As a result of various examinations, it was found that Mn diffused to the YSZ doped with Mn was extracted from the YSZ upon exposure to a reducing atmosphere, and it was revealed that a stabilizer, yttria, was also extracted from crystals at the same time, so that crystal transformation (change from cubic crystals to tetragonal crystals) of the solid electrolyte layer occurred.

It is conceivable that the amount of Mn doped and diffused near the interface with the fuel electrode varies depending on the atmosphere, and that when the SOFC is exposed to a reducing atmosphere, part of the Mn doped is extracted from the YSZ to the fuel electrode side. Presumably, the same phenomenon as that of Mn occurs in the case of Fe.

In the long-term durability test conducted for several thousand hours, no powder formation was observed in a portion of the solid electrolyte layer covered with the fuel electrode layer, but crystal transformation occurred in this portion as in the portion where the powder formation occurred. Hence, presumably, powder formation will occur during operation for several tens of thousands hours, and peeling (hereinafter, referred to as powder formation peeling) will occur between the solid electrolyte layer and the fuel electrode layer. If the powder formation peeling occurs, electricity cannot be extracted, and electric power generation is impossible. An SOFC is required to have a lifetime of about 40000 hours in the introduction period, and of about 90000 hours in the spread period. The powder formation peeling shown here is a technical problem which should be solved for introduction to the market.

Results of a SEM observation on the powder formation portion showed that particles fell off at grain boundaries, so that the powder formation occurred. This is presumably because the change from the cubic crystals to the tetragonal crystals caused decrease in volume, so that fracture occurred at the grain boundaries (see FIG. 1).

The present inventors provide an SOFC comprising a solid electrolyte layer having an improved strength between particles, in order that, in an SOFC comprising YSZ to which Mn or Fe is diffused from an oxygen electrode layer, the extraction of the stabilizer, yttria, from the crystals can be suppressed when Mn or Fe diffused to the YSZ doped with Mn or Fe is extracted from the YSZ upon exposure to a reducing atmosphere, and no intergranular fracture associated with the crystal transformation can be allowed even if the crystal transformation occurs.

To solve the above-described problem, an SOFC according to the present invention is a solid oxide fuel cell comprising: a solid electrolyte layer; an oxygen electrode layer provided on one surface of the solid electrolyte layer; and a fuel electrode layer provided on the other surface of the solid electrolyte layer, wherein the oxygen electrode layer is made of a material containing iron or manganese, and the solid electrolyte layer comprises a YSZ solid electrolyte material doped with lanthanoid oxide. In addition, the solid electrolyte material preferably contains alumina. Since alumina is contained in the YSZ solid electrolyte material, the Mn or Fe doping diffused to the inside of the YSZ is reduced. Hence, the amount of the stabilizer, yttria, simultaneously extracted from the crystals at the extraction of Mn or Fe from the YSZ is also reduced. However, since the Mn doping and the Fe doping cannot be reduced to 0 by this alone, the phenomenon in which a trace of Mn or Fe doping is extracted from the YSZ cannot be eliminated. In this respect, the present invention makes it possible to suppress the phenomenon itself in which yttria is extracted from the YSZ by the YSZ electrolyte material doped with a lanthanoid oxide, even if Mn or Fe is extracted from the YSZ. Moreover, since the alumina is present at grain boundaries of YSZ particle, and firmly connects the YSZ particles to each other. Hence, the alumina can also achieve an effect of suppressing the fracture at grain boundaries even when the slight volume change associated with the crystal transformation occurs. As a result, no powder formation occurs. Hence, an SOFC having a lifetime of 90000 hours, which is required in the spread period, can be provided.

In a preferred mode of the SOFC of the present invention, the solid electrolyte material doped with 8 to 15 mol % of the yttria and 1 to 5 mol % of the lanthanoid oxide, respectively, relative to the total amount of substances (total molar amount) of the zirconia, the yttria, and the lanthanoid oxide in the solid electrolyte material. The amount of yttria is preferably 8 to 15 mol %, because an amount of less than 8 mol % results in tetragonal crystals, and an amount exceeding 15 mol % may result in rhombohedral crystals, which lowers the oxygen ion conductivity. The amount of the lanthanoid oxide is preferably 1 to 5 mol %, because an amount of less than 1 mol % results in a decreased effect of suppressing the extraction of yttria at the extraction of Mn or Fe, and an amount exceeding 5 mol % increases the possibility of the crystal transformation because of formation of tetragonal crystals.

In a preferred mode of the SOFC of the present invention, the lanthanoid oxide is ceria. Ceria is preferable, because not only the extraction of yttria can be suppressed at the extraction of Mn or Fe, but also the oxygen ion conductivity of the solid electrolyte material can be improved.

In a preferred mode of the SOFC of the present invention, the solid electrolyte material contains more than 1 mol % of the alumina relative to the total amount of substances (total molar amount) of the zirconia, the yttria, and the lanthanoid oxide in the solid electrolyte material. The alumina is contained in an amount of more than 1 mol %, because an amount of 1 mol % or less results in a decreased effect of suppressing the Mn or Fe doping, and also a decreased effect of suppressing the intergranular fracture due to the volume change associated with the crystal transformation. In addition, the alumina amount is preferably 5 mol % or less. This is because an alumina amount of 5 mol % or less does not cause decrease in oxygen ion conductivity of the solid electrolyte material, or if some decrease is caused, the decrease can be minimized.

In a further preferred mode of the SOFC of the present invention, the lanthanoid oxide doping at the fuel electrode side of the solid electrolyte layer is higher than the lanthanoid oxide doping at the oxygen electrode side of the solid electrolyte layer. Examples thereof include one in which the lanthanoid oxide doping gradually decreases from the fuel electrode side to the oxygen electrode side, and the like. This makes it possible to minimize the decrease in oxygen ion conductivity of the solid oxide layer as a whole, while preventing the powder formation peeling on the fuel electrode layer side. In still another preferred mode of the SOFC of the present invention, the solid electrolyte layer consists of two layers of a first layer formed at the oxygen electrode layer side and a second layer formed at the fuel electrode layer side, and the lanthanoid oxide doping in the second layer is higher than the lanthanoid oxide doping in the first layer. More preferably, the second layer contains more than 1 mol % of alumina, and the amount of alumina in the second layer is higher than the amount of alumina in the first layer. Further preferably, the first layer is not doped with lanthanoid oxide, and contains no alumina. In addition, the first layer may use scandia stabilized zirconia, or yttria stabilized zirconia. The SOFC comprising the solid electrolyte layer of the present invention has a high efficiency, and a lifetime of 90000 hours, which is required in the spread period. This is because of the following reason. Specifically, in the second layer on the fuel electrode layer side, the powder formation peeling can be prevented, but the ion conductivity decreases because of the inclusion of alumina and the like. In contrast, in the first layer on the oxygen electrode layer side, the oxygen ion conductivity remains high, and the internal resistance remains small. Hence, the powder formation peeling can be prevented from occurring, while the decrease in oxygen ion conductivity of the solid oxide layer as a whole is minimized.

In a preferred mode of the SOFC of the present invention, the first layer is thicker than the second layer. The SOFC comprising the solid electrolyte layer of the present invention has a high efficiency, and a lifetime of 90000 hours, which is required in the spread period. This is because, since the thickness of the second layer is minimum necessary for preventing the powder formation peeling, the contribution of the high oxygen ion conductivity of the first layer is increased, so that the electric power generation efficiency can be further increased. A minimum necessary thickness of the second layer for preventing the powder formation peeling is, for example, 1 μm or more, and preferably 3 μm or more.

According to the present invention, a solid electrolyte layer having an improved strength between particles is provided in order to suppress the extraction of the stabilizer, yttria, from crystals at the extraction, from the YSZ, of Mn or Fe doped and diffused to the oxygen electrode layer from the YSZ upon exposure to a reducing atmosphere, and to allow no intergranular fracture associated with the crystal transformation even when the crystal transformation occurs. Hence, it is possible to suppress the powder formation associated with the crystal transformation of zirconia and the powder formation peeling which may occur several tens of thousands hours later between the fuel electrode layer and the solid electrolyte layer. Therefore, the present invention makes it possible to provide a solid oxide fuel cell which has a lifetime of about 90000 hours required in the spread period of an SOFC.

DETAILED DESCRIPTION OF THE PREFERRED EMBODIMENTS

Figure 2:
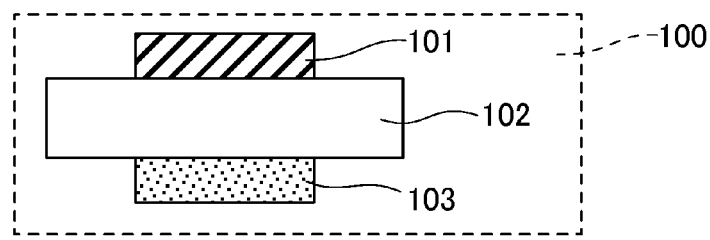
FIG. 2 is a diagram showing an example of an SOFC of the present invention.

Hereinafter, embodiments of the present invention will be described with reference to the drawings. FIG. 2 is an SOFC of an embodiment of the present invention. An oxygen electrode layer 101 is provided on one surface of a solid electrolyte layer 102, and a fuel electrode layer 103 is provided on another surface of the solid electrolyte layer 102. Conventionally, YSZ has been mainly used as the solid electrolyte layer, from the viewpoints of relatively high oxygen ion conductivity and excellent durability. However, a long-term durability test conducted for several hundred to several thousand hours showed that, in an SOFC using YSZ, the stabilizer, yttria, was extracted from crystals, when Mn or Fe diffused from the oxygen electrode layer was extracted from the YSZ upon exposure to a reducing atmosphere, so that crystal transformation (change from cubic crystals to tetragonal crystals) of the solid electrolyte layer 102 occurred. In addition, powder formation was observed in an uncovered portion of the solid electrolyte layer 102. Hence, presumably, the crystal transformation occurred also in a portion of the solid electrolyte layer 102 covered with the fuel electrode layer 103 in the same manner, and the powder formation peeling will occur between the solid electrolyte layer 102 and the fuel electrode layer 103 during operation for several tens of thousands hours.

Figure 1:
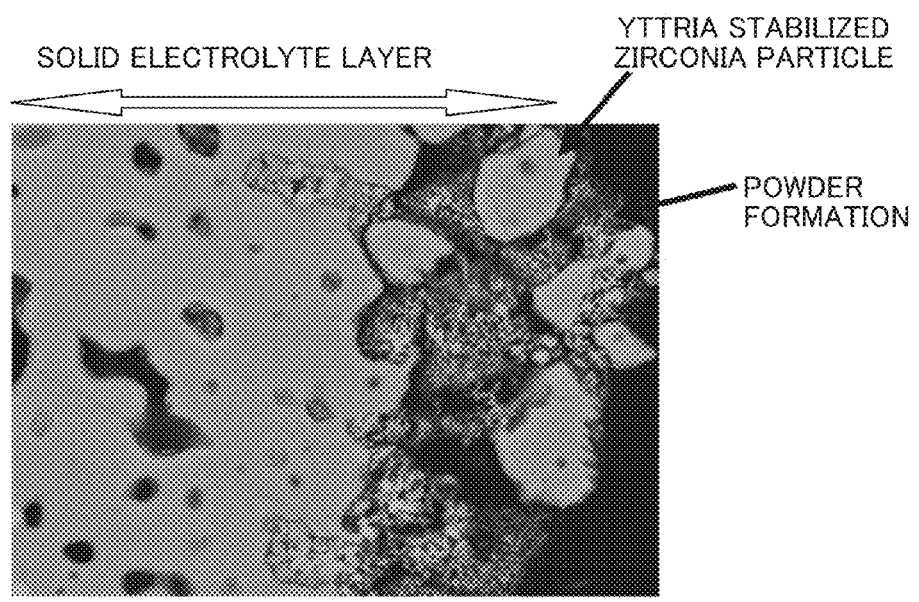
FIG. 1 is an SEM photograph showing a powder formation phenomenon of a solid electrolyte layer in prior art.
Figure 3:
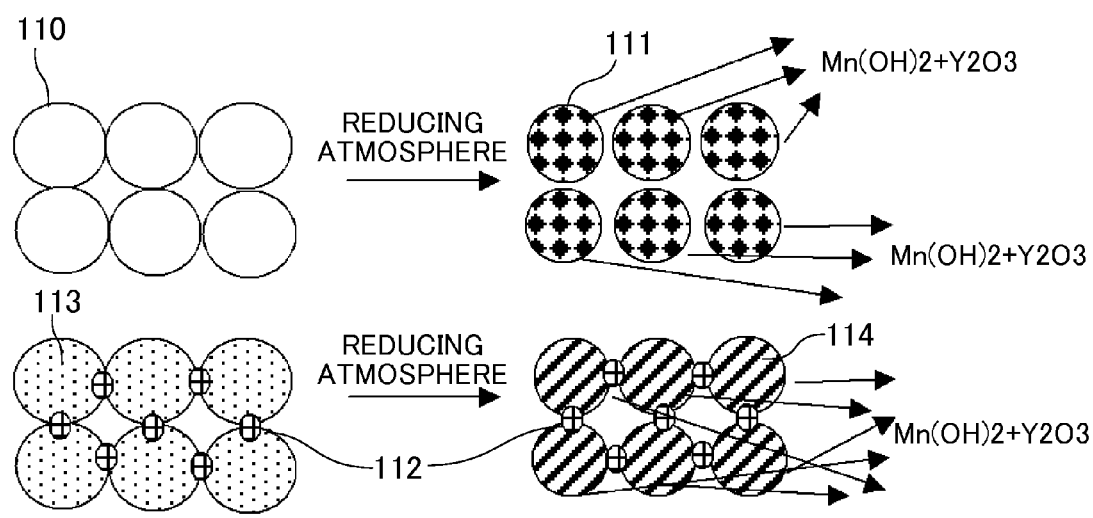
FIG. 3 is a diagram showing the difference in change associated with crystal transformation of a solid electrolyte layer between a conventional case and the present invention.
Figure 4:
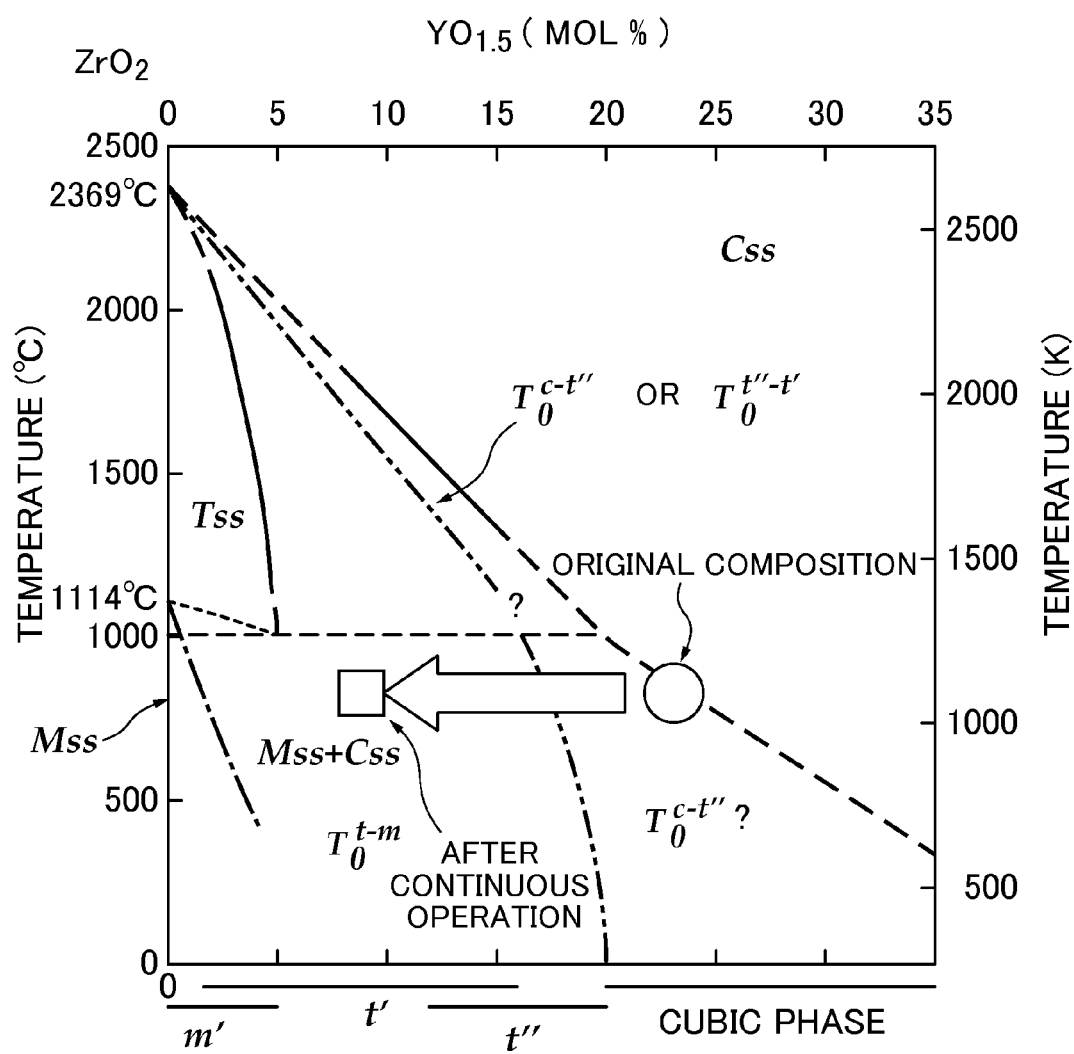
FIG. 4 is a diagram showing the crystal state of YSZ depending on the $Y_2O_3$ concentration and the temperature.

The difference in change associated with the crystal transformation of the solid electrolyte layer between a conventional case and the present invention is described based on FIG. 3. A solid electrolyte layer which has a 10YSZ composition corresponding to that of Comparative Example 1 doped with several mol % of Mn has a cubic crystal structure 110 at the production thereof. When the solid electrolyte layer is exposed to a reducing atmosphere, Mn is extracted in the form of MnO or $Mn(OH)_2$, and yttria ($Y_2O_3$) is extracted from the crystal phase. Consequently, the crystal phase changes from the cubic crystals (c) 110 to tetragonal crystals (t) 111, as shown in the phase diagram of FIG. 4. The change from the cubic crystals (c) 110 to the tetragonal crystals (t) 111 results in decrease in lattice constants and decrease in volume. Presumably as a result of this, intergranular fracture occurs, and the powder formation as shown in the SEM image of FIG. 1 occurs. In the SOFC of the present invention, the solid electrolyte material doped with a lanthanoid oxide in order to suppress the extraction of yttria ($Y_2O_3$) from the crystal phase. For example, cubic crystals (c) 113 having a 10Y0.5CeSZ composition are used. Moreover, although yttria becomes resistant to the extraction by this countermeasure, the cubic crystals (c) 113 eventually change to tetragonal crystals (t) 114 even with this composition. Hence, it is more preferable to reinforce the grain boundaries in order to prevent the intergranular fracture even after the crystal transformation occurs due to the extraction of yttria. In the present invention, the YSZ electrolyte material further contains alumina 112.

A more preferred composition of the YSZ electrolyte material is such that the yttria doping is 8 to 15 mol % and the lanthanoid oxide doping is 1 to 5 mol %, relative to the total amount of substances (total molar amount) of the zirconia, the yttria, and the lanthanoid oxide in the solid electrolyte material. It is more preferable that more than 1 mol % of alumina is further contained relative to the total amount of substances (total molar amount) of the zirconia, the yttria, and the lanthanoid oxide in the solid electrolyte material. The amount of yttria is preferably 8 to 15 mol %, because an amount of less than 8 mol % results in tetragonal crystals, and an amount exceeding 15 mol % may result in rhombohedral crystals, which lowers the oxygen ion conductivity. The amount of the lanthanoid oxide is preferably 1 to 5 mol %, because an amount of less than 1 mol % results in a decreased effect of suppressing the extraction of yttria at the extraction of Mn or Fe, and an amount exceeding 5 mol % increases the possibility of the crystal transformation because of the formation of tetragonal crystals. The alumina is contained in an amount of more than 1 mol %, because an amount of 1 mol % or less results in a decreased effect of suppressing the intergranular fracture due to the volume change associated with the crystal transformation.

Figure 5:
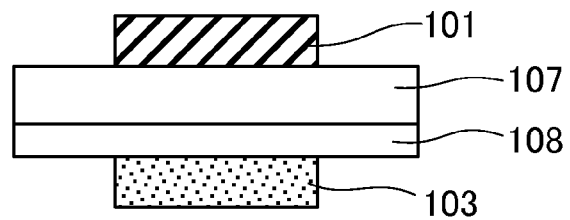
FIG. 5 is a diagram showing a best mode of the SOFC of the present invention.

A major problem of the solid electrolyte layer of the SOFC of the present invention is the deterioration at the extraction of Mn or Fe, which is diffused from the oxygen electrode layer, from the YSZ in a reducing atmosphere. From the viewpoints of increasing the efficiency and of a high durability of the SOFC, the solid electrolyte layer preferably comprises two layers of a first layer 107 located on the oxygen electrode layer 101 side and having a high oxygen ion conductivity, and a second layer 108 located on the fuel electrode layer side 103 and made of a solid electrolyte material which is YSZ containing alumina and doped with a lanthanoid (see FIG. 5). From the viewpoint of a high efficiency, the first layer is more preferably thicker than the second layer.

The fuel electrode layer 103 in the SOFC of the present invention only needs to satisfy the following requirements: having a high electrical conductivity, which enables an electric output to be obtained by an electrochemical reaction in which $O^{2-}$ react with $H_2$; being chemically stable; and having a coefficient of thermal expansion close to that of the solid electrolyte layer 102. Conventionally used fuel electrode layers can be employed without any particular limitation. Typical examples thereof include a cermet of Ni and ScSZ, a cermet of Ni and yttria stabilized zirconia (hereinafter, referred to as YSZ), a cermet of Ni and cerium oxide, and the like.

The oxygen electrode layer 101 in the SOFC of the present invention only needs to satisfy the following requirements: having a high electrical conductivity and having a high catalytic activity for converting an oxidizing agent gas such as oxygen ($O_2$) into oxygen ions ($O^{2-}$); being chemically stable; and having a coefficient of thermal expansion close to that of the solid electrolyte layer 102. Conventionally used oxygen electrode layers can be employed without any particular limitation. Examples thereof include strontium doped lanthanum manganite (hereinafter, referred to as LSM), strontium doped lanthanum ferrite (hereinafter, referred to as LSF), strontium and iron doped lanthanum cobaltite (hereinafter, referred to as LSCF), and the like.

In the production of the solid electrolyte material, any method generally employed in this technical field may be used without any particular limitation. For example, the solid electrolyte material of the present invention can be produced as follows, although the method is not limited to this one. Specifically, particles of zirconia, particles of yttria, and particles of the lanthanoid oxide are mixed with each other at a given blending ratio; the mixture is ground in a grinding machine such as a ball mill, and then sintered; the sintered material is ground in a grinding machine such as a ball mill; then the ground material is mixed with alumina and a binder component; and the mixture is molded and sintered.

In the production of the SOFC of the present invention, any method generally employed in this technical field may be used without any particular limitation. For example, the SOFC of the present invention can be produced by forming an oxygen electrode layer on one surface of the solid electrolyte material of the present invention and a fuel electrode layer on the other surface thereof by the screen printing method or the like, followed by sintering.

The SOFC of the present invention may be of any type such as the flat-plate vertical-stripe type, the flat-plate lateral-stripe type, the flat tubular type, the tubular vertical-stripe type, the tubular lateral-stripe type, or the microtube type.

EXAMPLES

Example 1

A test conducted by fabricating a cell of the type shown in FIG. 2 is described. A $ZrO_2$ raw material (average particle diameter: 0.3 μm), a $Y_2O_3$ raw material (average particle diameter: 0.3 μm), and a $CeO_2$ raw material (average particle diameter: 0.3 μm) were weighed to give a 10Y2CeSZ composition represented by the general formula of 88 mol % ($ZrO_2$)-10 mol % ($Y_2O_3$)-2 mol % ($CeO_2$). These raw materials were wet blended in an ethanol solvent for 50 hr, and dried and ground. Then, the blend was sintered at 1200° C. The sintered material was ground into a powder. Then, to the powder, $Al_2O_3$ (average particle diameter: 0.5 μm) was added in an amount equivalent to 2 mol % relative to the total amount of substances (total molar amount) of the zirconia, the yttria, and the lanthanoid oxide in the solid electrolyte material, and 2 wt % of $MnO_2$ (average particle diameter: 0.5 μm) in terms of Mn content and 5 wt % of a binder PVA were added thereto relative to the total weight of all components in the solid electrolyte material, followed by mixing in a mortar. The powder containing the PVA was press molded at 50 MPa, and sintered at 1450° C. for 5 hr. Thus, a dense solid electrolyte layer having a 10Y2CeSZ2Al composition was obtained. After the layer was polished to a thickness of about 200 μm, a film of LSM (average particle diameter: 2 μm) was formed as an oxygen electrode layer by screen printing so as to give a thickness of 20 μm after sintering, and a film of 40 wt % NiO-60 wt % YSZ (average particle diameter: 2 μm) was formed as a fuel electrode layer on an opposite surface by screen printing so as to form a cermet of Ni and YSZ and to give a thickness of 20 μm after sintering. Then, sintering was carried out at 1400° C. for 2 hr.

Example 2

Example 2 was conducted in the same manner as in Example 1, except for the following points. Specifically, to a powder having a 10Y2CeSZ composition represented by the general formula of 88 mol % ($ZrO_2$)-10 mol % ($Y_2O_3$)-2 mol % ($CeO_2$), $Al_2O_3$ was added in an amount equivalent to 2 mol % relative to the total amount of substances (total molar amount) of the zirconia, the yttria, and the lanthanoid oxide in the solid electrolyte material, and 2 wt % of $Fe_2O_3$ (average particle diameter: 0.5 μm) in terms of Fe content and 5 wt % of a binder PVA were added thereto relative to the total weight of all components in the solid electrolyte material. Thus, a dense solid electrolyte layer having a 10Y2CeSZ2Al composition was obtained. In addition, LSF (average particle diameter: 2 μm) was used as the oxygen electrode layer.

Example 3

Example 3 was conducted in the same manner as in Example 1, except for the following points. Specifically, to a powder having a 10Y2CeSZ composition represented by the general formula of 88 mol % ($ZrO_2$)-10 mol % ($Y_2O_3$)-2 mol % ($CeO_2$), $Al_2O_3$ was added in an amount equivalent to 2 mol %. In addition, 1 wt % of $MnO_2$ (average particle diameter: 0.5 μm) in terms of Mn content, 1 wt % of $Fe_2O_3$ (average particle diameter: 0.5 μm) in terms of Fe content, and 5 wt % of a binder PVA were added thereto relative to the total weight of all components in the solid electrolyte material. Thus, a dense solid electrolyte layer having a 10Y2CeSZ2Al composition was obtained. In addition, LSF (average particle diameter: 2 μm) was used as the oxygen electrode layer.

Comparative Example 1

Comparative Example 1 was conducted in the same manner as in Example 1, except that a dense solid electrolyte layer was obtained by adding no $Al_2O_3$ to a powder having a 10YSZ composition represented by the general formula of 90 mol % ($ZrO_2$)-10 mol % ($Y_2O_3$).

Comparative Example 2

Comparative Example 2 was conducted in the same manner as in Example 2, except that a dense solid electrolyte layer was obtained by adding no $Al_2O_3$ to a powder having a 10YSZ composition represented by the general formula of 90 mol % ($ZrO_2$)-10 mol % ($Y_2O_3$).

Comparative Example 3

Comparative Example 3 was conducted in the same manner as in Example 1, except that a dense solid electrolyte layer was obtained as follows. Specifically, to a powder having a 10YSZ composition represented by the general formula of 90 mol % ($ZrO_2$)-10 mol % ($Y_2O_3$), $Al_2O_3$ was added in an amount equivalent to 0.5 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

Comparative Example 4

Comparative Example 4 was conducted in the same manner as in Example 2, except that a dense solid electrolyte layer was obtained as follows. Specifically, to a powder having a 10YSZ composition represented by the general formula of 90 mol % ($ZrO_2$)-10 mol % ($Y_2O_3$), $Al_2O_3$ was added in an amount equivalent to 0.5 mol %, and 5 wt % of a binder PVA was added.

(Testing Method)

Figure 6:
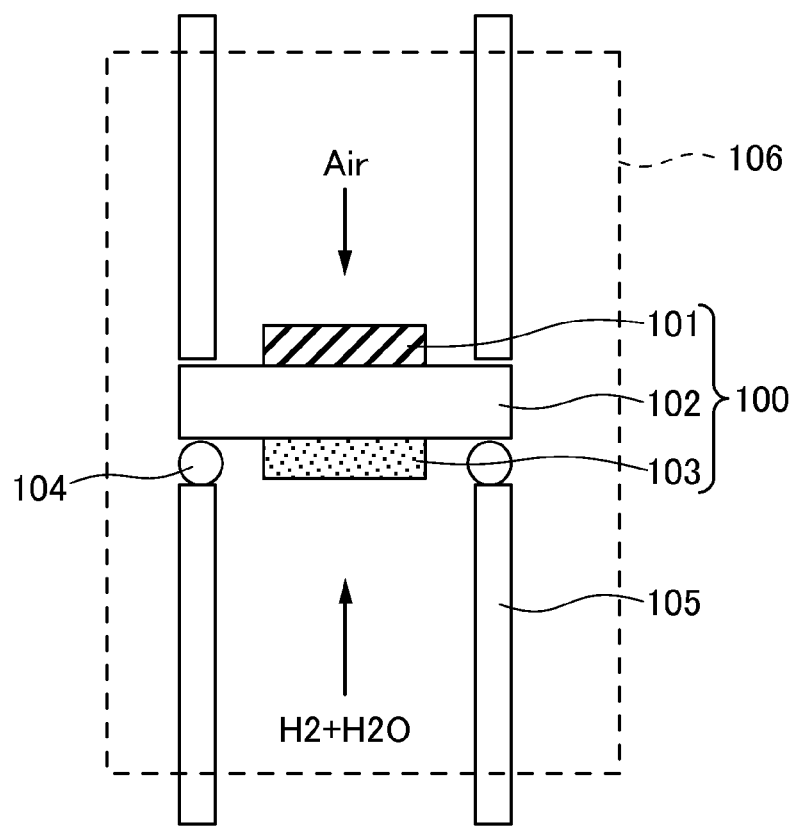
FIG. 6 is a diagram showing a testing apparatus for demonstrating effects of the present invention.

FIG. 6 schematically shows a testing apparatus. A glass seal ($SiO_2$+$B_2O_3$) 104 was placed in an apparatus held by a zirconia tube 105, and the fabricated SOFC 100 was placed on the glass seal 104. Moreover, a zirconia tube 105 was placed on an upper surface of the SOFC 100. While the air was passed on the upper surface of the SOFC of each of Examples 1 to 3 and Comparative Examples 1 to 4, and 97% $N_2$+3% $H_2$ was passed on a lower surface thereof, the temperature of the electric furnace 106 was raised to 1000° C. While the air was passed on the upper surface (on the first layer side) of the SOFC, and a fuel gas (70% $H_2$+30% $H_2O$) was passed on the lower surface thereof, the temperature was kept at 1000° C. for 400 hr. Then, while the air was passed on the upper surface (on the first layer side) of the SOFC, and 97% $N_2$+3% $H_2$ was passed on the lower surface thereof, the temperature was lowered to room temperature.

(Analysis 1)

After the SOFC 100 was peeled off from the glass seal 104, an exposed surface of the solid electrolyte layer 102 of the SOFC 100, the exposed surface not having been in contact with the glass seal 104, was analyzed by SEM and Raman spectroscopy, and the presence or absence of powder formation and the crystal phase were examined. In addition, the crystal phases of all the SOFCs were checked by Raman spectroscopy before the test.

The SEM observation was carried out by using S-4100 of Hitachi High-Technologies Co., Japan at an acceleration voltage of 15 kV and at a 1000-fold magnification. In the Raman spectroscopy, mode of vibration of Zr-0 on the surface of the electrolyte was analyzed by using NRS-2100 of JASCO Co., Japan. The measurement was conducted with a detector equipped with a triple monochromator at a wavenumber resolution of 1 $cm^{-1}$ with an observation spot of 8 μm in diameter, and an excitation wavelength of 523 nm.

TABLE 1

| | Composition | Mn content (wt %) | Fe content (wt %) | Initial stage Crystal phase | 400 hr later Powder formation | Crystal phase |
|---|---|---|---|---|---|---|
| Example 1 | 10Y2CeSZ2Al | 2 | | C | Absent | C |
| Example 2 | 10Y2CeSZ2Al | | 2 | C | Absent | C |
| Example 3 | 10Y2CeSZ2Al | 1 | 1 | C | Absent | C |
| Comp. Ex. 1 | 10YSZ | 2 | | C | Present | t |
| Comp. Ex. 2 | 10YSZ | | 2 | C | Present | t |
| Comp. Ex. 3 | 10YSZ0.5Al | 2 | | C | Present | t |
| Comp. Ex. 4 | 10YSZ0.5Al | | 2 | C | Present | t |

Table 1 shows the test results. The notation is as follows: c: cubic crystals, and t: tetragonal crystals. The powder formation was observed in each of Comparative Examples 1 to 4. In contrast, no powder formation was observed in any of Examples 1 to 3. This demonstrated that the powder formation can be suppressed by employing the composition of the present invention. In addition, it was found that the crystal phase remained the c phase in all of Examples 1 to 3, whereas the crystal phase was transformed to the t phase in all of Comparative Examples 1 to 4. It was found that the composition of the present invention reduced the possibilities of the powder formation and the crystal transformation even when Mn or Fe was contained.

(Analysis 2)

The SOFCs of Examples 1 and 2 and Comparative Examples 3 and 4 were analyzed as follows. Specifically, the fuel electrode layer 103 was peeled off, and the surface of the solid electrolyte layer 102 having been covered with the fuel electrode layer 103 was analyzed by SEM and Raman spectroscopy.

TABLE 2

| | Composition | Powder formation | Cracks | Crystal phase |
|---|---|---|---|---|
| Example 1 | 10Y2CeSZ2Al | Absent | Absent | C |
| Example 2 | 10Y2CeSZ2Al | Absent | Absent | C |
| Comp. Ex. 3 | 10YSZ0.5Al | Absent | Present | t |
| Comp. Ex. 4 | 10YSZ0.5Al | Absent | Present | t |

Table 2 shows the results of the analysis. No powder formation was observed in the solid electrolyte layers covered with the fuel electrode layers. However, in Comparative Examples 3 and 4, the crystal phase had already changed to the t phase, and cracks were observed at grain boundaries. On the other hand, in Examples 1 and 2, no powder formation was observed, the crystal phase was unchanged, and no cracks were observed at grain boundaries. It is suggested that, in the case of Comparative Examples 3 and 4, the powder formation may occur during a further long time operation, and the powder formation peeling may occur between the fuel electrode layer 103 and the solid electrolyte layer 102.

Optimization of Composition

Example 4

Example 4 was conducted in the same manner as in Example 1, except that a dense solid electrolyte layer was obtained as follows. Specifically, to a powder having a 10Y0.5CeSZ composition represented by the general formula of 89.5 mol % ($ZrO_2$)-10 mol % ($Y_2O_3$)-0.5 mol % ($CeO_2$), $Al_2O_3$ was added in an amount equivalent to 2 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

Example 5

Example 5 was conducted in the same manner as in Example 1, except that a dense solid electrolyte layer was obtained as follows. Specifically, to a powder having a 10Y1CeSZ composition represented by the general formula of 89 mol % ($ZrO_2$)-10 mol % ($Y_2O_3$)-1 mol % ($CeO_2$), $Al_2O_3$ was added in an amount equivalent to 2 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

Example 6

Example 6 was conducted in the same manner as in Example 1, except that a dense solid electrolyte layer was obtained as follows. Specifically, to a powder having a 10Y4CeSZ composition represented by the general formula of 86 mol % ($ZrO_2$)-10 mol % ($Y_2O_3$)-4 mol % ($CeO_2$), $Al_2O_3$ was added in an amount equivalent to 2 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

Example 7

Example 7 was conducted in the same manner as in Example 1, except that a dense solid electrolyte layer was obtained as follows. Specifically, to a powder having a 10Y5CeSZ composition represented by the general formula of 85 mol % $(ZrO_2)$-10 mol % $(Y_2O_3)$-5 mol % $(CeO_2)$, $Al_2O_3$ was added in an amount equivalent to 2 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

Example 8

Example 8 was conducted in the same manner as in Example 1, except that a dense solid electrolyte layer was obtained as follows. Specifically, to a powder having a 10Y6CeSZ composition represented by the general formula of 84 mol % $(ZrO_2)$-10 mol % $(Y_2O_3)$-6 mol % $(CeO_2)$, $Al_2O_3$ was added in an amount equivalent to 2 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

Example 9

Example 9 was conducted in the same manner as in Example 1, except that a dense solid electrolyte layer was obtained as follows. Specifically, to a powder having a 7Y1CeSZ composition represented by the general formula of 92 mol % $(ZrO_2)$-7 mol % $(Y_2O_3)$-1 mol % $(CeO_2)$, $Al_2O_3$ was added in an amount equivalent to 2 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

Example 10

Example 10 was conducted in the same manner as in Example 1, except that a dense solid electrolyte layer was obtained as follows. Specifically, to a powder having an 8Y1CeSZ composition represented by the general formula of 91 mol % $(ZrO_2)$-8 mol % $(Y_2O_3)$-1 mol % $(CeO_2)$, $Al_2O_3$ was added in an amount equivalent to 2 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

Example 11

Example 11 was conducted in the same manner as in Example 1, except that a dense solid electrolyte layer was obtained as follows. Specifically, to a powder having a 15Y1CeSZ composition represented by the general formula of 84 mol % $(ZrO_2)$-15 mol % $(Y_2O_3)$-1 mol % $(CeO_2)$, $Al_2O_3$ was added in an amount equivalent to 2 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

Example 12

Example 12 was conducted in the same manner as in Example 1, except that a dense solid electrolyte layer was obtained as follows. Specifically, to a powder having a 16Y1CeSZ composition represented by the general formula of 83 mol % $(ZrO_2)$-16 mol % $(Y_2O_3)$-1 mol % $(CeO_2)$, $Al_2O_3$ was added in an amount equivalent to 2 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

While the air was passed on the upper surface of the SOFC of each of Examples 1, and 4 to 12, and 97% $N_2$+3% $H_2$ was passed on a lower surface thereof by using the testing apparatus shown in FIG. 6, the temperature of the electric furnace 106 was raised to 1000° C. While the air was passed on the upper surface (on the first layer side) of the SOFC, and a fuel gas (70% $H_2$+30% $H_2O$) was passed on the lower surface thereof, the temperature was kept at 1000° C. for 400 hr. Then, while the air was passed on the upper surface (on the first layer side) of the SOFC, and 97% $N_2$+3% $H_2$ was passed on the lower surface thereof, the temperature was lowered to room temperature. An exposed surface of the solid electrolyte layer 102 of the SOFC 100, the exposed surface not having been in contact with the glass seal 104, was analyzed by SEM and Raman spectroscopy in the same manner, and the presence or absence of powder formation and the crystal phase were examined.

TABLE 3

| | Composition | Initial stage Crystal phase | 400 hr later Powder formation | Crystal phase |
|---|---|---|---|---|
| Example 1 | 10Y2CeSZ2Al | C | Absent | C |
| Example 4 | 10Y0.5CeSZ2Al | C | Absent | t |
| Example 5 | 10Y1CeSZ2Al | C | Absent | C |
| Example 6 | 10Y4CeSZ2Al | C | Absent | C |
| Example 7 | 10Y5CeSZ2Al | C | Absent | C |
| Example 8 | 10Y6CeSZ2Al | C | Absent | t |
| Example 9 | 7Y1CeSZ2Al | C | Absent | t |
| Example 10 | 8Y1CeSZ2Al | C | Absent | C |
| Example 11 | 15Y1CeSZ2Al | C | Absent | C |
| Example 12 | 16Y1CeSZ2Al | C + r | Absent | C + r |

Table 3 shows the test results. The notation is as follows: c: cubic crystals, t: tetragonal crystals, and r: rhombohedral crystals. No powder formation was observed in any of Examples 1, and 4 to 12. This demonstrated that the powder formation can be suppressed by employing the composition of the present invention. In addition, the crystal phase was transformed to the t phase in each of Examples 4, 8, and 9, and the r phase, which causes phase transformation at around 630° C., partially remained in Example 12. In contrast, the crystal phase remained the c phase in each of Examples 1, 5, 6, 7, 10, and 11. From these results, more preferred compositions are those of Examples 1, 5, 6, 7, 10, and 11, which is doped with 8 to 15 mol % of yttria and 1 to 5 mol % of a lanthanoid oxide.

Regarding Lanthanoid Oxides Other than $CeO_2$

Example 13

Example 13 was conducted in the same manner as in Example 1, except that a dense solid electrolyte layer having a 10Y2SmSZ2Al composition was obtained as follows. Specifically, to a powder having a 10Y2SmSZ composition represented by the general formula of 88 mol % ($ZrO_2$)-10 mol % ($Y_2O_3$)-2 mol % ($Sm_2O_3$), $Al_2O_3$ was added in an amount equivalent to 2 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

Example 14

Example 14 was conducted in the same manner as in Example 1, except that a dense solid electrolyte layer having a 10Y2YbSZ2Al composition was obtained as follows. Specifically, to a powder having a 10Y2YbSZ composition represented by the general formula of 88 mol % ($ZrO_2$)-10 mol % ($Y_2O_3$)-2 mol % ($Yb_2O_3$), $Al_2O_3$ was added in an amount equivalent to 2 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

Example 15

Example 15 was conducted in the same manner as in Example 1, except that a dense solid electrolyte layer having a 10Y2LaSZ2Al composition was obtained as follows. Specifically, to a powder having a 10Y2LaSZ composition represented by the general formula of 88 mol % ($ZrO_2$)-10 mol % ($Y_2O_3$)-2 mol % ($La_2O_3$), $Al_2O_3$ was added in an amount equivalent to 2 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

While the air was passed on the upper surface of the SOFC of each of Examples 1, and 13 to 15, and 97% $N_2$+3% $H_2$ was passed on a lower surface thereof by using the testing apparatus shown in FIG. 6, the temperature of the electric furnace 106 was raised to 1000° C. While the air was passed on the upper surface (on the first layer side) of the SOFC, and a fuel gas (70% $H_2$+30% $H_2O$) was passed on the lower surface thereof, the temperature was kept at 1000° C. for 400 hr. Then, while the air was passed on the upper surface (on the first layer side) of the SOFC, and 97% $N_2$+3% $H_2$ was passed on the lower surface thereof, the temperature was lowered to room temperature. A surface of the solid electrolyte layer 102 of the SOFC 100, the surface not having been in contact with the glass seal 104, was analyzed by SEM and Raman spectroscopy in the same manner, and the presence or absence of powder formation and the crystal phase were examined.

TABLE 4

| | Composition | Initial stage Crystal phase | 400 hr later Powder formation | Crystal phase |
|---|---|---|---|---|
| Example 1 | 10Y2CeSZ2Al | C | Absent | C |
| Example 13 | 10Y2SmSZ2Al | C | Absent | C |
| Example 14 | 10Y2YbSZ2Al | C | Absent | C |
| Example 15 | 10Y2LaSZ2Al | C | Absent | C |

Table 4 shows the results of the analysis after the test. No powder formation was observed in any of Examples 13 to 15, and the crystal phase remained the c phase therein. These results are the same as those of Example 1, indicating that the same effect as that achieved in the case where $CeO_2$ doped can be achieved, also when a lanthanoid oxide other than $CeO_2$ doped.

The electric conductivities of the solid electrolyte materials of Examples 1, 13, 14, and 15 were measured. Each solid electrolyte material was press molded, and sintered at 1450° C. for 5 hr. Then, platinum electrodes were attached onto both surfaces thereof, and a reference electrode was attached onto a side surface thereof. The impedance was measured at 1000° C. under atmospheric atmosphere.

TABLE 5

| | Composition | Electric conductivity at 1000° C. (S/cm) |
|---|---|---|
| Example 1 | 10Y2CeSZ2Al | 0.10 |
| Example 13 | 10Y2SmSZ2Al | 0.08 |
| Example 14 | 10Y2YbSZ2Al | 0.07 |
| Example 15 | 10Y2LaSZ2Al | 0.07 |

Table 5 shows the results of the electric conductivities. The electric conductivity of Example 1 was the highest, indicating that ceria is the most preferable as the lanthanoid oxide doped.

Regarding Alumina Amount

Example 16

Example 16 was conducted in the same manner as in Example 1, except that a dense solid electrolyte layer was obtained as follows. Specifically, to a powder having a 10Y2CeSZ composition represented by the general formula of 88 mol % ($ZrO_2$)-10 mol % ($Y_2O_3$)-2 mol % ($CeO_2$), $Al_2O_3$ was added in an amount equivalent to 0.5 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

Example 17

Example 17 was conducted in the same manner as in Example 1, except that a dense solid electrolyte layer was obtained as follows. Specifically, to a powder having a 10Y2CeSZ composition represented by the general formula of 88 mol % ($ZrO_2$)-10 mol % ($Y_2O_3$)-2 mol % ($CeO_2$), $Al_2O_3$ was added in an amount equivalent to 1 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

Example 18

Example 18 was conducted in the same manner as in Example 1, except that a dense solid electrolyte layer was obtained as follows. Specifically, to a powder having a 10Y2CeSZ composition represented by the general formula of 88 mol % ($ZrO_2$)-10 mol % ($Y_2O_3$)-2 mol % ($CeO_2$), $Al_2O_3$ was added in an amount equivalent to 1.5 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

Example 19

Example 19 was conducted in the same manner as in Example 1, except that a dense solid electrolyte layer was obtained as follows. Specifically, to a powder having a 10Y2CeSZ composition represented by the general formula of 88 mol % ($ZrO_2$)-10 mol % ($Y_2O_3$)-2 mol % ($CeO_2$), $Al_2O_3$ was added in an amount equivalent to 5 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material.

While the air was passed on the upper surface of the SOFC of each of Examples 1, and 16 to 19, and 97% $N_2$+3% $H_2$ was passed on a lower surface thereof by using the testing apparatus shown in FIG. 6, the temperature of the electric furnace 106 was raised to 1000° C. While the air was passed on the upper surface (on the first layer side) of the SOFC, and a fuel gas (70% $H_2$+30% $H_2O$) was passed on the lower surface thereof, the temperature was kept at 1000° C. for 400 hr. Then, while the air was passed on the upper surface (on the first layer side) of the SOFC, and 97% $N_2$+3% $H_2$ was passed on the lower surface thereof, the temperature was lowered to room temperature. A surface of the solid electrolyte layer 102 of the SOFC 100, the surface not having been in contact with the glass seal 104, was analyzed by SEM and Raman spectroscopy in the same manner, and the presence or absence of powder formation and the crystal phase were examined.

TABLE 6

| | Composition | Initial stage Crystal phase | 400 hr later Powder formation | Crystal phase |
|---|---|---|---|---|
| Example 1 | 10Y2CeSZ2Al | C | Absent | C |
| Example 16 | 10Y2CeSZ0.5Al | C | Absent | t |
| Example 17 | 10Y2CeSZ1Al | C | Absent | t |
| Example 18 | 10Y2CeSZ1.5Al | C | Absent | C |
| Example 19 | 10Y2CeSZ5Al | C | Absent | C |

Table 6 shows the test results. The notation is as follows: c: cubic crystals, and t: tetragonal crystals. No powder formation was observed in any of Examples 1, and 16 to 19. This demonstrated that the powder formation can be suppressed by employing the composition of the present invention. In addition, the crystal phase was transformed to the t phase in each of Examples 16 and 17, and the crystal phase remained the c phase in Examples 1, 18, and 19. From these results, it was found that more preferred compositions are those of Examples 1, 18, and 19, and it is more preferable to contain more than 1 mol % of alumina.

Regarding Two-Layer Structure of Solid Electrolyte Layer

Example 20

(1) Fabrication of First Layer

A $ZrO_2$ raw material (average particle diameter: 0.3 μm), a $Y_2O_3$ raw material (average particle diameter: 0.3 μm), and a $CeO_2$ raw material (average particle diameter: 0.3 μm) were weighed to give a 10Y0.5CeSZ composition represented by the general formula of 89.5 mol % ($ZrO_2$)-10 mol % ($Y_2O_3$)-0.5 mol % ($CeO_2$). These raw materials were wet blended in an ethanol solvent for 50 hr, and dried and ground. Then, the blend was sintered at 1200° C. The sintered material was ground into a powder. Then, to the powder, $Al_2O_3$ (average particle diameter: 0.5 μm) was added in an amount equivalent to 2 mol % relative to the total amount of substances (total molar amount) of the zirconia, the yttria, and the lanthanoid oxide in the solid electrolyte material, and 2 wt % of $MnO_2$ (average particle diameter: 0.5 μm) in terms of Mn content and 5 wt % of a binder PVA were added thereto relative to the total weight of all components in the solid electrolyte material, followed by mixing in a mortar. The powder containing the PVA was press molded at 50 MPa. Thus, a molded article having a 10Y0.5CeSZ2Al composition was fabricated.

(2) Fabrication of Second Layer

A $ZrO_2$ raw material (average particle diameter: 0.3 μm), a $Y_2O_3$ raw material (average particle diameter: 0.3 μm), and a $CeO_2$ raw material (average particle diameter: 0.3 μm) were weighed to give a 10Y2CeSZ composition represented by the general formula of 88 mol % ($ZrO_2$)-10 mol % ($Y_2O_3$)-2 mol % ($CeO_2$). These raw materials were wet blended in an ethanol solvent for 50 hr, and dried and ground. Then, the blend was sintered at 1200° C. The sintered material was ground into a powder. Then, to the powder, $Al_2O_3$ (average particle diameter: 0.5 μm) was added in an amount equivalent to 2 mol % relative to the total amount of substances (total molar amount) of the zirconia, the yttria, and the lanthanoid oxide in the solid electrolyte material, and 2 wt % of $MnO_2$ (average particle diameter: 0.5 μm) in terms of Mn content and 5 wt % of a binder PVA were added thereto relative to the total weight of all components in the solid electrolyte material, followed by mixing in a mortar. The powder containing the PVA was press molded at 50 MPa. Thus, a molded article having a 10Y2CeSZ2Al composition was fabricated.

(3) Fabrication of Cell

The molded article having the 10Y0.5CeSZ2Al composition and serving as the first layer and the molded article having the 10Y2CeSZ2Al composition and serving as the second layer were stacked on each other, thermally adhered to each other under pressure, and then sintered at 1450° C. for 5 hr. The first layer was polished to a thickness of about 190 μm, and the second layer was polished to a thickness of about 10 μm. Then, a film of LSM (average particle diameter: 2 μm) was formed as an oxygen electrode layer on the surface of the first layer by screen printing so as to give a thickness of 20 μm after sintering, and a film of 40 wt % NiO-60 wt % YSZ (average particle diameter: 2 μm) was formed as a fuel electrode layer on the surface of the second layer by screen printing so as to form a cermet of Ni and YSZ and to give a thickness of 20 μm after sintering. Then, sintering was carried out at 1400° C. for 2 hr.

Example 21

Example 21 was conducted in the same manner as in Example 20, except for the following points. Specifically, the materials were weighed to give a 10Y2CeSZ composition represented by the general formula of 88 mol % $(ZrO_2)$-10 mol % $(Y_2O_3)$-2 mol % $(CeO_2)$. These raw materials were wet blended in an ethanol solvent for 50 hr, and dried and ground. Then, the blend was sintered at 1200° C., and then ground. $Al_2O_3$ (average particle diameter: 0.5 μm) was added thereto in an amount equivalent to 0.5 mol % relative to the total amount of substances (total molar amount) of the zirconia, the yttria, and the lanthanoid oxide in the solid electrolyte material, and 5 wt % of a binder PVA was added thereto relative to the total weight of all components in the solid electrolyte material. Thus, a first layer having a 10Y2CeSZ0.5Al composition was obtained.

Example 22

Example 22 was conducted in the same manner as in Example 20, except that the composition of the first layer was changed to a 10YSZ composition to which no $Al_2O_3$ was added and which is represented by the general formula of 90 mol % $(ZrO_2)$-10 mol % $(Y_2O_3)$.

While the air was passed on the upper surface (on the first layer side) of the SOFC of each of Examples 20, 21, and 22, and 97% $N_2$+3% $H_2$ was passed on the lower surface (on the second layer side) thereof by using the testing apparatus shown in FIG. 6, the temperature of the electric furnace 106 was raised to 1000° C. While the air was passed on the upper surface (on the first layer side) of the SOFC, and a fuel gas (70% $H_2$+30% $H_2O$) was passed on the lower surface thereof, the temperature was kept at 1000° C. for 400 hr. Then, while the air was passed on the upper surface (on the first layer side) of the SOFC, and 97% $N_2$+3% $H_2$ was passed on the lower surface thereof, the temperature was lowered to room temperature. An exposed surface of the solid electrolyte layer 102 of the SOFC 100, the exposed surface not having been in contact with the glass seal 104, was analyzed by SEM and Raman spectroscopy in the same manner. Thus, the presence or absence of powder formation and the crystal phase were examined, and a comparison with Example 1 was made.

TABLE 7

|  | Initial stage Crystal phase | 400 hr later Powder formation | Crystal phase |
| --- | --- | --- | --- |
| Example 1 | C | Absent | C |
| Example 20 | C | Absent | C |
| Example 21 | C | Absent | C |
| Example 22 | C | Absent | C |

Table 7 shows the results of the analysis after the test. No powder formation was observed in any of Examples 20, 21, and 22, and the crystal phase remained the c phase therein. It was found that the powder formation and the crystal transformation were successfully suppressed by providing the second layer comprising the solid electrolyte material of the present invention in which no phase transformation occurred to the solid electrolyte material, which would have otherwise undergone the powder formation or the transformation to the t phase upon exposure to the fuel gas.

The electric conductivities of the solid electrolyte materials of Examples 1, 20, 21, and 22 were measured. Each solid electrolyte material was press molded and sintered at 1450° C. for 5 hr. Platinum electrodes were attached onto both surfaces thereof, and a reference electrode was attached onto a side surface thereof. The impedance was measured at 1000° C. under atmospheric atmosphere.

TABLE 8

|  | Electric conductivity at 1000° C. (S/cm) |
| --- | --- |
| Example 1 | 0.10 |
| Example 20 | 0.12 |
| Example 21 | 0.11 |
| Example 22 | 0.13 |

Table 8 shows the results of the electric conductivities. It was found that the provision of the layer having a high oxygen ion conductivity to the first layer resulted in a higher electric conductivity than that of Example 1, so that the electric power generation efficiency was increased. From these results, it has been found that it is more effective to form the second layer in a thickness minimum necessary for preventing the powder formation peeling.

Example 23

Example 23 was conducted in the same manner as in Example 20, except that the composition of the first layer was changed to a 10ScSZ composition to which no $Al_2O_3$ was added and which is represented by the general formula of 90 mol % $(ZrO_2)$-10 mol % $(Sc_2O_3)$.

Example 24

Example 24 was conducted in the same manner as in Example 20, except that the composition of the first layer was changed to a 10Sc1CeSZ composition to which no $Al_2O_3$ was added and which is represented by the general formula of 89 mol % $(ZrO_2)$-10 mol % $(Sc_2O_3)$-1 mol % $CeO_2$.

While the air was passed on the upper surface (on the first layer side) of the SOFC of each of Examples 23 and 24, and 97% $N_2$+3% $H_2$ was passed on the lower surface (on the second layer side) thereof by using the testing apparatus shown in FIG. 6, the temperature of the electric furnace 106 was raised to 1000° C. While the air was passed on the upper surface (on the first layer side) of the SOFC, and a fuel gas (70% $H_2$+30% $H_2O$) was passed on the lower surface thereof, the temperature was kept at 1000° C. for 400 hr. Then, while the air was passed on the upper surface (on the first layer side) of the SOFC, and 97% $N_2$+3% $H_2$ was passed on the lower surface thereof, the temperature was lowered to room temperature. An exposed surface of the solid electrolyte layer 102 of the SOFC 100, the exposed surface not having been in contact with the glass seal 104, was analyzed by SEM and Raman spectroscopy in the same manner. Thus, the presence or absence of powder formation and the crystal phase were examined, and a comparison with Example 1 was made.

TABLE 9

|  | Initial stage Crystal phase | 400 hr later Powder formation | Crystal phase |
|---|---|---|---|
| Example 1 | C | Absent | C |
| Example 23 | C | Absent | C |
| Example 24 | C | Absent | C |

Table 9 shows the results of the analysis after the test. No powder formation was observed in any of Examples 23 and 24, and the crystal phase remained the c phase therein. It was found that the SOFC having the electrolyte two-layer structure and using scandia as the stabilizer of the first layer also achieved the same effect, when the second layer had the composition falling within the scope of the claims.

Effects of the present invention are described based on the SOFC of the type using the solid electrolyte layer as a support. However, the same effects are obtained also in SOFCs using an oxygen electrode layer or a fuel electrode layer as a support.

Regarding the design of the SOFC, the description is made based on the flat plate type. However, the same effects are obtained in the case of any type such as the flat tubular type, the tubular vertical-stripe type, and the microtube type.

In Examples shown above, the cases in each of which the YSZ electrolyte material doped with only one lanthanoid oxide were tested. However, it is conceivable that the same effects as those in Examples shown above can be obtained also in a case where a YSZ electrolyte material doped with a combination of two or more lanthanoid oxides.

The invention claimed is:

1. A solid oxide fuel cell comprising:
a solid electrolyte layer;
an oxygen electrode layer provided on one surface of the solid electrolyte layer; and
a fuel electrode layer provided on the other surface of the solid electrolyte layer,
wherein the oxygen electrode layer is made of a material containing iron or manganese, and the solid electrolyte layer consists essentially of a yttria stabilized zirconia solid electrolyte material that is doped with ceria, wherein the solid electrolyte material is doped with 8 to 15 mol % of the yttria and 1 to 5 mol % of the ceria, each being relative to the total molar amount of the zirconia, the yttria, and the lanthanoid oxide in the solid electrolyte material and the solid electrolyte material further contains 1.5 to 5 mol % of the alumina relative to the total molar amount of the zirconia, the yttria, and the ceria in the solid electrolyte material.

2. The solid oxide fuel cell according to claim 1, wherein the ceria doping at the fuel electrode side of the solid electrolyte layer is higher than the ceria doping at the oxygen electrode side of the solid electrolyte layer.

3. The solid oxide fuel cell according to claim 1, wherein the solid electrolyte layer consists of two layers with a first layer formed at the oxygen electrode layer side and a second layer formed at the fuel electrode layer side, and wherein the ceria doping in the second layer is higher than the ceria doping in the first layer.

4. The solid oxide fuel cell according to claim 3, wherein the amount of the alumina in the second layer is higher than the amount of alumina in the first layer.

5. The solid oxide fuel cell according to claim 4, wherein the first layer is not doped with ceria, and contains no alumina.

6. The solid oxide fuel cell according to claim 3, wherein the first layer is thicker than the second layer.

\* \* \* \* \*